United States Patent Office 3,014,839
Patented Dec. 26, 1961

3,014,839
PHOSPHORUS-CONTAINING INSECTICIDES
Alan R. Stiles and Loyal F. Ward, Jr., Modesto, Calif., assignors to Shell Oil Company, a corporation of Delaware
No Drawing. Filed Nov. 23, 1959, Ser. No. 854,595
12 Claims. (Cl. 167—30)

This invention relates to novel aryl esters of phosphoric acid, and to the use of such esters as insecticides.

It has been found highly desirable for many applications that an insecticide have a substantial residual toxicity. Thus, in the control of such flying insect pests as mosquitoes and flies in and around barns, dwellings, brushy areas, and like environments, it has been found that a contact insecticide is much more effective if it is stable and continues to be toxic for an extended period of time after it has been applied. Such an insecticide when sprayed on solid surfaces such as the walls of buildings, on brush and trees, continues to kill insects which come into contact with the insecticide-covered surfaces and thus is much more effective than an insecticide which has little or no residual toxicity.

Various poly-halogenated materials have been found to have extended residual toxicity. However, these materials all appear to be subject to the same disadvantage—insects tend to rather quickly develop resistance to the toxic effects thereof. As alternate insecticides to which insects have not developed immunity, there have been proposed certain organic phosphorus-containing compounds. For example, Stiles, United States Patent No. 2,685,552, describes 2-methoxycarbonyl-1-methylvinyl dimethyl phosphate as an insecticide of outstanding toxicity. However, despite their impressive initial toxicity, many of these phosphorus compounds have been found to be effective for only a short time and consequently are rendered less effective, or altogether useless, in those situations calling for extended residual toxicity.

A new class of organic phosphorus-containing compounds has been found in which a high initial level of insecticidal activity is maintained for an extended period of time. This new class of insecticides has been found to be useful for the destruction and control of mosquitoes.

The new insecticides are the unsubstituted phenyl esters of 2-alkoxycarbonylvinyl- and 2-benzyloxycarbonylvinyl- and alkyl hydrogen phosphates, being characterized by an unsubstituted phenyl group bonded via oxygen to a phosphoryl group to which there are also bonded via oxygen each of an alkyl group and a 2-alkoxycarbonylvinyl group or 2-benzyloxycarbonylvinyl group. The new insecticides are characterized by the structural formula:

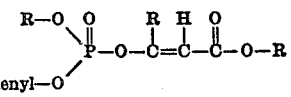

wherein R represents a lower alkyl radical, especially the methyl radical; R' and R" each represents a member of the group consisting of the hydrogen atom, and lower alkyl radicals; and R° represents a lower alkyl group, preferably the methyl group, or the benzyl group. Because of their higher initial insecticidal activity, the preferred compounds of this class are those wherein R° represents lower alkyl. The preferred alkyl radicals are those containing from 1 to 4 carbon atoms.

Typical species of this class of compounds include: 2-methoxycarbonylvinyl methyl phenyl phosphate; 2-methoxycarbonylvinyl ethyl phenyl phosphate; 2-ethoxycarbonyl-1-methylvinyl methyl phenyl phosphate; 2-isopropoxycarbonylvinyl methyl phenyl phosphate; 2-benzyloxycarbonylvinyl methyl phenyl phosphate; 2-ethoxycarbonyl-1-methylvinyl isopropyl phenyl phosphate; 2-isopropoxycarbonyl-1,2-diethylvinyl propyl phenyl phosphate; 2-butoxycarbonyl-2-methylvinyl ethyl phenyl phosphate; 2-secbutoxycarbonyl-2-isopropyl butyl phenyl phosphate and the like.

A preferred subgroup of this new class of compounds is that wherein R' and R° each represents lower alkyl, particularly methyl, and R" represents hydrogen, because these compounds exhibit the highest initial level of insecticidal activity. This subgroup of course is represented by the formula:

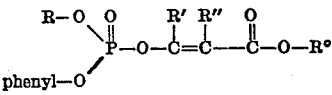

wherein the symbols have the respective meanings already set out.

The new insecticides are conveniently prepared by reacting an alkyl ester of an alpha-chloro fatty acid with a dialkyl phenyl phosphite according to the equation:

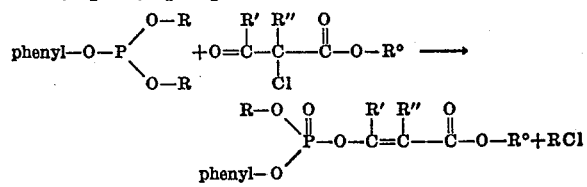

wherein the symbols have the respective meanings already set out.

The chloroester reactant can be obtained by reacting a fatty acid ester with sulfuryl chloride according to the method described by MacBeth in 123 J. Am. Chem. Soc., 1122 et seq. (1925).

The phenyl dialkyl phosphite reactant can be prepared by methods shown in the prior art—for example, in U.S. Patent No. 2,866,807 and the prior art references cited therein. For example, a phenyl-phosphorochloridite can be reacted with an alkanol in the molar proportions of about 1:2, according to the equation Phenyl-O—PCl$_2$+2ROH→phenyl-O—P(OR)$_2$+2HCl The hydrogen chloride is removed from the reaction zone as it is formed by reaction with a hydrogen halide acceptor, such as pyridine, or a dialkylaniline, or ammonia.

The reaction between the chloroester reactant and the phosphite reactant is effected by slowly mixing about an equimolar amount of the phosphite with the chloroester, the temperature being controlled either by heating or by cooling as necessary to maintain the reaction temperature within the range of from about 60° C. to about 150° C. The by-product alkyl chloride may be removed from the reaction zone as it is formed by adjusting the pressure in the reaction system so that the alkyl chloride volatilizes while the product phosphate and the reactants do not. However, in some cases the boiling point of the alkyl chloride by-product will be fairly close to the boiling point of the chloroester reactant, so that such a technique is undesirable; in such cases, the formed alkyl chloride is most conveniently allowed to remain in the reaction zone until the desired reaction is substantially complete and then is removed together with any unreacted chloroester reactant by distillation of the reaction mixture under reduced pressure. Some of the higher molecular weight reactants and reaction products are solids at ordinary temperatures; in these cases use of an inert solvent such as xylene insures a fluid reaction system. To insure complete reaction between the phosphite and the chloroester, the reaction mixture is heated for a reasonable time—e.g., from about one hour to about six hours—after addition of all of the phosphite.

The phosphate product can be recovered by distillation under sufficiently low pressure that thermal decomposition of the product is avoided. With the higher molecular weight products, however, it is often convenient to recover the phosphate by crystallization or by molecular distillation. Where the desired product has the highest boiling point of any component in the crude reaction mixture, the product can in some cases be obtained by merely stripping off the lower boiling materials to recover the product as residue.

Because of the reactivity of the various compounds involved, it is usually necessary to exclude water from the reaction and work-up zones.

Preparation of typical members of the compounds of this invention is described in detail in the following examples. These examples are intended to be illustrative and exemplary in character only, and are not to be considered as limiting the invention in any way.

EXAMPLE I

*Preparation of 2-methoxycarbonyl-1-methylvinyl methyl phenyl phosphate*

99 grams (0.533 mole) of dimethyl phenyl phosphite was added over a period of one hour to 79.5 grams (0.528 mole) of methyl 2-chloroacetoacetate at room temperature. The mixture then was heated slowly (45 minutes) to 105° C. and held at that temperature for two hours. It then was heated to 120° C. and held at that temperature for 30 minutes. It then was allowed to cool and stand overnight, after which it was heated at 120–133° C. for 2½ hours. A total of 12.5 grams, or 46.8% of theory, of methyl chloride was recovered from a cold trap connected to the reactor. The product was Claisen distilled to give 60 grams, or 39.7% of theory, of a product boiling at 136–139° C. at 0.02 millimeter mercury pressure. The product was identified as 2-methoxycarbonylvinyl methyl phenyl phosphate by infrared spectrum analysis and by elemental analysis:

| Element | Found, percent | Calculated, percent |
|---|---|---|
| Carbon | 50.2 | 50.4 |
| Hydrogen | 5.1 | 5.2 |
| Phosphorus | 10.8 | 10.8 |

EXAMPLE II

*Preparation of 2-methoxycarbonyl-1-methylvinyl ethyl phenyl phosphate*

101 grams (0.472 mole) of diethyl phenyl phosphite was added over a period of 30 minutes to 65 grams (0.432 mole) of methyl 2-chloroacetoacetate at 70–80° C. The mixture then was heated for five hours at 100–105° C., and for four hours at 115–120° C. 19 grams, or 68.2% of theory of ethyl chloride was evolved. The reaction mixture was stripped and Claisen distilled to give 104 grams, or 80.4% of theory, of a product boiling at 137–141° C. at 0.03–0.05 millimeter mercury pressure. The product was identified as 2-methoxycarbonylvinyl ethyl phenyl phosphate by infrared spectrum analysis and by elemental analysis.

| Element | Found, percent | Calculated, percent |
|---|---|---|
| Carbon | 52.6 | 52.0 |
| Hydrogen | 6.0 | 5.7 |
| Phosphorus | 9.9 | 10.3 |

That the compounds of the present invention possess insecticidal activity and are particularly outstanding in their property of extended residual toxicity is evidenced by the results of experiments set out in Tables I through III, following, wherein a typical compound of the present invention is compared with certain compounds of somewhat related structure which are shown by the prior art to be outstanding insecticides.

EXAMPLE III

*Preparation of 2-benzyloxycarbonyl-1-methylvinyl methyl phenyl phosphate*

54 grams (0.29 mole) dimethyl phenyl phosphate was added dropwise over 1¼ hours to 59 grams (0.26 mole) benzyl 2-chloroacetoacetate, the mixture being maintained at 90–96° C. The mixture then was heated at 96–105° C. for 1½ hours, at 100–105° C. for 1½ hours, for 5 minutes at 103° C. and 20–30 millimeters mercury pressure and finally for 15 minutes at 105° C. and 20–30 millimeters mercury pressure. The mixture then was allowed to cool to room temperature and stand overnight. It then was heated for 2 hours at 100–105° C. and stripped for 15 minutes while cooling, all at 20–30 millimeters mercury pressure. The residue then was stripped in a molecular still to give 51.5 grams of a product boiling at 155° C. at 0.0005 millimeter mercury pressure. The product (55% yield) was identified by elemental analysis and infrared spectrum analysis as 2-benzyloxycarbonyl-1-methylvinyl methyl phenyl phosphate.

EXAMPLE IV

The insecticidal activity of 2-methoxycarbonyl-1-methylvinyl methyl phenyl phosphate, a typical species of the insecticidal compounds of the present invention, was compared to that of 2-methoxy carbonyl-1-methylvinyl dimethyl phosphate as follows: A solution of the toxicant to be tested, in acetone, was applied by pipette to a petri dish, and the acetone allowed to evaporate. The concentration of toxicant in the solution and the amount of solution was controlled to give the desired quantity of toxicant per square inch of the surface of the petri dish. The dishes were held at 80° F. and 50% relative humidity. Adult *Anopheles albimanus* mosquitoes were exposed for one hour to the treated dishes at intervals. At each exposure, ten mosquitoes were used on each of two replicates. The results obtained were expressed as the average 24-hour mortality counts of the paired replicates. The following results were obtained.

TABLE I

| Compound | Dosage [1] | Average percent mortality for 1-hour exposure at intervals indicated | | |
|---|---|---|---|---|
| | | Fresh deposit | 1 day | 4 days |
| 2-methoxycarbonyl-1-methylvinyl dimethyl phosphate | 1 | 100 | 100 | 5 |
| | 2 | 100 | 85 | 5 |
| | 5 | 100 | 95 | 0 |
| 2-methoxycarbonyl-1-methylvinyl methyl phenyl phosphate | 1 | 100 | 100 | 100 |
| | 2 | 100 | 100 | 100 |
| | 5 | 100 | 100 | 100 |
| Acetone control | | 0 | 0 | 0 |

[1] Dosage: milligrams of toxicant per square foot of surface.

EXAMPLE V

In larger scale tests, the same two compounds were compared by spraying 25% emulsifiable concentrates upon plywood panels, and evaluating the toxicity of the deposits at weekly intervals, using *Anopheles albimanus* mosquitoes as the test insect. The following results were obtained:

TABLE II

| Compound | Dosage [1] | Average percent mortality at weeks after spray | | | |
|---|---|---|---|---|---|
| | | 1 | 2 | 3 | 4 |
| 2-methoxycarbonyl-1-methylvinyl dimethyl phosphate | 25 | 100 | 90 | 20 | 25 |
| | 50 | 100 | 100 | 65 | 55 |
| 2-methoxycarbonyl-1-methylvinyl methyl phenyl phosphate | 25 | 100 | 100 | 100 | 100 |
| | 50 | 100 | 100 | 100 | 100 |

[1] Dosage: milligrams of toxicant per square foot of surface.

EXAMPLE VI

The insecticidal activity of 2-methoxycarbonyl-1-methylvinyl methyl phenyl phosphate also was compared with the activities of 2-ethoxycarbonyl-1-methylvinyl ethyl p-nitrophenyl phosphate and 2-methoxycarbonyl-1-methylvinyl methyl p-nitrophenyl phosphate. The test method was that set out in Example I. The following results were obtained:

TABLE III

| Compound | Dosage [1] | Average percent mortality for 1-hour exposure at intervals indicated | |
|---|---|---|---|
| | | Fresh deposit | 3 days |
| 2-carbethoxy-1-methylvinyl ethyl p-nitrophenyl phosphate | [2] 0.1 | 100 | 35 |
| 2-carbomethoxy-1-methylvinyl methyl p-nitrophenyl phosphate | [2] 0.15 | 100 | 30 |
| 2-carbomethoxy-1-methylvinyl methyl phenyl phosphate | [2] 0.25 | 100 | 100 |
| 2-carbobenzyloxy-1-methylvinyl methyl phenyl phosphate | [2] 5.0 | 100 | [3] 95 |

[1] Dosage: milligrams of toxicant per square foot of surface.
[2] Dosage in each case is the same multiple of the $LD_{50}$ dosage of the test compound.
[3] 4-day-old deposit.

The compounds of this invention have particular utility as insecticides because they possess outstanding toxicity to insects when applied as contact insecticides, and this toxicity is maintained for long periods of time. By the term "insects" is meant not only the members of the class Insecta but also related or similar invertabrate animal organisms belonging to the allied classes of arthropods and including ticks, mites, spiders, wood lice and the like. The compounds of this invention have been found to be outstandingly effective against mosquitoes.

The compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, resin salts, saponins, gelatin, casein, long-chain fatty alcohols, alkyl aryl sulfonates, long-chain alkyl sulfonates, phenol-ethylene oxide condensates, $C_{12}$ to $C_{20}$ amines and amonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint, as wherein high concentrations of active material are used in low-volume sprays or dusts.

When employed as an insecticide, a compound of this invention can be employed either as the sole toxic ingredient or the insecticidal composition, or it can be employed in conjunction with the other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, and the various compounds of arsenic lead and/or fluorine.

We claim as our invention:

1. As a novel compound, a phenyl phosphate of the formula:

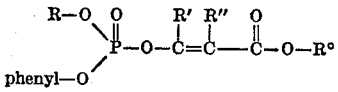

wherein R represents a lower alkyl radical, R' and R" each represents a member of the group consisting of hydrogen and lower alkyl radicals, and R° represents a member of the group consisting of lower alkyl and benzyl.

2. As a novel compound, a phenyl phosphate of the formula:

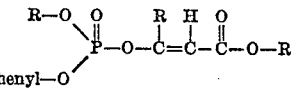

wherein R and R' each represents a lower alkyl radical.

3. As a novel compound, a phenyl phosphate of the formula set out in claim 2 wherein R' represents the methyl radical.

4. As a novel compound, 2-carbomethoxy-1-methylvinyl methyl phenyl phosphate.

5. As an insecticidal composition of matter, a compound of claim 2 disseminated in an insecticidal adjuvant as a carrier therefor.

6. As an insecticidal composition of matter, a compound of claim 2 disseminated in an insecticidal adjuvant as a carrier therefor.

7. As an insecticidal composition of matter, a compound of claim 3 disseminated in an insecticidal adjuvant as a carrier therefor.

8. As an insecticidal composition of matter, a compound of claim 4 disseminated in an insecticidal adjuvant as a carrier therefor.

9. A method of combating insects which comprises applying to insect habitats a compound of claim 1.

10. A method of combating insects which comprises applying to insect habitats a compound of claim 2.

11. A method of combating insects which comprises applying to insect habitats a compound of claim 3.

12. A method of combating insects which comprises applying to insect habitats a compound of claim 4.

References Cited in the file of this patent

UNITED STATES PATENTS

| 2,802,855 | Whetstone et al. | Aug. 13, 1957 |
| 2,894,018 | Lorenz et al. | July 7, 1959 |

FOREIGN PATENTS

| 552,417 | Canada | Jan. 28, 1958 |